(12) United States Patent
Kato et al.

(10) Patent No.: US 9,101,094 B2
(45) Date of Patent: Aug. 11, 2015

(54) ELECTRICALLY POWERED GARDEN TOOL

(71) Applicant: MAKITA CORPORATION, Aichi (JP)

(72) Inventors: Kazuya Kato, Aichi (JP); Hideaki Takano, Aichi (JP); Yuki Koide, Aichi (JP)

(73) Assignee: MAKITA CORPORATION, Aichi (JP)

( * ) Notice: Subject to any disclaimer, the term of this patent is extended or adjusted under 35 U.S.C. 154(b) by 98 days.

(21) Appl. No.: 13/899,837

(22) Filed: May 22, 2013

(65) Prior Publication Data

US 2013/0318799 A1    Dec. 5, 2013

(30) Foreign Application Priority Data

May 30, 2012  (JP) ................................. 2012-123434
May 30, 2012  (JP) ................................. 2012-123439

(51) Int. Cl.
  *A01G 3/053*    (2006.01)
  *A01G 3/06*     (2006.01)
  *A01G 3/04*     (2006.01)

(52) U.S. Cl.
  CPC ................. *A01G 3/053* (2013.01); *A01G 3/067* (2013.01); *A01G 2003/0461* (2013.01)

(58) Field of Classification Search
  CPC .................. A01G 3/053; A01G 3/067; A01G 2003/0461; A01G 3/086; B25F 5/02; B27B 17/00; B27B 17/0008
  USPC ................. 30/216, 228, 241, 208, 381, 277.4
  See application file for complete search history.

(56) References Cited

U.S. PATENT DOCUMENTS

| 3,083,457 | A | * | 4/1963 | Ottosen et al. ................... 30/216 |
| 3,431,647 | A | * | 3/1969 | Scott ............................... 30/210 |
| 3,699,655 | A | * | 10/1972 | Taylor et al. .................... 30/216 |
| 2009/0235880 | A1 | * | 9/2009 | Ziegs ......................... 123/41.65 |
| 2010/0095533 | A1 | * | 4/2010 | Takahashi et al. .............. 30/228 |
| 2013/0160304 | A1 | * | 6/2013 | Tate ............................... 30/381 |
| 2013/0180811 | A1 | * | 7/2013 | Poertzgen et al. ............ 188/156 |

FOREIGN PATENT DOCUMENTS

| EP | 0032968 | | 8/1981 | |
| EP | 2177102 | | 4/2010 | |
| GB | 229868 | * | 3/1924 | ............... B25F 5/02 |
| GB | 1462839 | | 1/1977 | |
| JP | 2007-075917 | | 3/2007 | |
| JP | 2007075917 | * | 3/2007 | ............... B25F 5/02 |
| JP | 2010-094086 | | 4/2010 | |

OTHER PUBLICATIONS

Search report from E.P.O., mail date is Oct. 18, 2013.

* cited by examiner

*Primary Examiner* — Ghassem Alie
(74) *Attorney, Agent, or Firm* — Greenblum & Bernstein, P.L.C.

(57) ABSTRACT

An electrically powered garden tool includes an electric motor mounted upright within an outer shell housing, a pair of relatively reciprocating shear blades assembled to be driven by operation of the motor through a crank mechanism provided within a lower portion of the outer shell housing, and a cooling fan assembled to be driven by operation of the motor for introducing outside air into an upper portion of the outer shell housing to exhaust the introduced air from a lower portion of the outer shell housing. In the garden tool, a downward exhaust opening is formed within a lower end peripheral wall of the outer shell housing enclosing the crank mechanism such that the air spouted by rotation of the cooling fan blows out downward from the downward exhaust opening to restrain the occurrence of blowing noise of the air.

2 Claims, 6 Drawing Sheets

US 9,101,094 B2

ELECTRICALLY POWERED GARDEN TOOL

BACKGROUND OF THE INVENTION

1. Field of the Invention

The present invention relates to electrically powered garden tools such as a power-operated hedge trimmer, an electrically powered grass shear and the like.

2. Description of the Prior Art

Disclosed in Japanese Patent Laid-open Publication Nos. 2007-075917 and 2010-094086 is an electrically powered hedge trimmer of the type which includes an electric motor mounted upright within an outer shell housing, a pair of relatively reciprocating shear blades assembled to be driven by operation of the motor through a crank mechanism provided within a lower portion of the outer shell housing, and a cooling fan assembled to be driven by operation of the motor for introducing outside air from an intake opening formed in an upper peripheral wall of the outer shell housing and for exhausting the sucked air from an opening laterally formed in a lower peripheral wall of the outer shell housing.

When the electric motor of the hedge trimmer is activated to impart reciprocal motion to the shear blades and to rotate the cooling fan, an operator is situated in an unpleasant condition caused by the blow of air exhausted laterally from the exhaust opening of the lower peripheral wall of the outer shell housing. The operator is also situated in an unpleasant condition caused by blow noises of the exhaust air and driving noises transmitted from the crank mechanism during reciprocal motion of the shear blades.

Disclosed in Japanese Patent Publication No. No. 2010-094086 is a hedge trimmer of the type which includes an electric motor mounted upright within a motor housing, a pair of relatively reciprocating shear blades assembled to be driven by operation of the motor through a crank mechanism provided within a lower portion of the motor housing, and a cooling fan assembled to be driven by the motor for introducing outside air from an intake opening formed in an upper peripheral wall of the motor housing and for exhausting the sucked air from an exhaust opening formed in a lower peripheral wall of the motor housing, and an outer shell housing enclosing the intake opening and exhaust opening of the motor housing.

When the electric motor of the hedge trimmer is activated to impart reciprocal motion to the shear blades and to rotate the cooling fan, the air exhausted from the lower opening of the motor housing blows out from the lower end opening of the outer shell housing through a space between the lower peripheral walls of the outer shell housing and motor housing. As the exhaust air from the motor housing blows out from the lower end opening of the outer shell housing, the exhaust air directly blowing against the operator is restrained. However, the exhaust air from the lower end opening of the outer shell housing blows against the lower end peripheral wall of the motor housing protruded toward the lower end opening of the outer shell housing and blows out obliquely in a side direction. Due to such blow of the exhaust air, it is unable to reduce blowing noises of the air exhausted from the lower end opening of the outer shell housing and to reduce driving noises caused by reciprocal motion of the shear blades.

SUMMARY OF THE INVENTION

It is, therefore, an object of the present invention to overcome the disadvantages of the prior art by providing an electrically powered garden tool such as a hedge trimmer capable of reducing blowing noises of exhaust air for improvement of a working condition of an operator.

According to the present invention, there is provided an electrically powered garden tool which comprises an electric motor mounted upright within an outer shell housing, a pair of relatively reciprocating shear blades assembled to be driven by operation of the motor through a crank mechanism provided within a lower portion of the outer shell housing, and a cooling fan assembled to be driven by operation of the motor for introducing outside air into an upper portion of the outer shell housing and for exhausting the introduced air from a lower portion of the outer shell housing, wherein a downward exhaust opening is formed within a lower end peripheral wall of the outer shell housing enclosing the crank mechanism such that the air spouted by rotation of the cooling fan blows out downward from the downward exhaust opening.

In the garden tool, the air exhausted by operation of the cooling fan blows out from the downward exhaust opening of the outer shell housing along the inner surface of the lower peripheral wall of the outer housing. This is effective to improve a working condition of an operator of the garden tool without suffering from blowing noise of the air exhausted from the outer shell housing.

In the case that a motor housing is assembled within the outer shell housing to contain therein the electric motor, cooling fan and crank mechanism and that the motor housing is provided with an exhaust opening to exhaust the air spouted by rotation of said cooling fan so that the spouted air blows out downward from the downward exhaust opening of the outer shell housing through a space between the peripheral walls of the motor housing and the outer shell housing, it is able to enhance the exhaust efficiency of the cooling air.

DESCRIPTION OF THE PREFERRED EMBODIMENTS

Hereinafter, preferred embodiments of an electrically powered hedge trimmer according to the present invention will be described with reference to the accompanying drawings.

Figure 2:
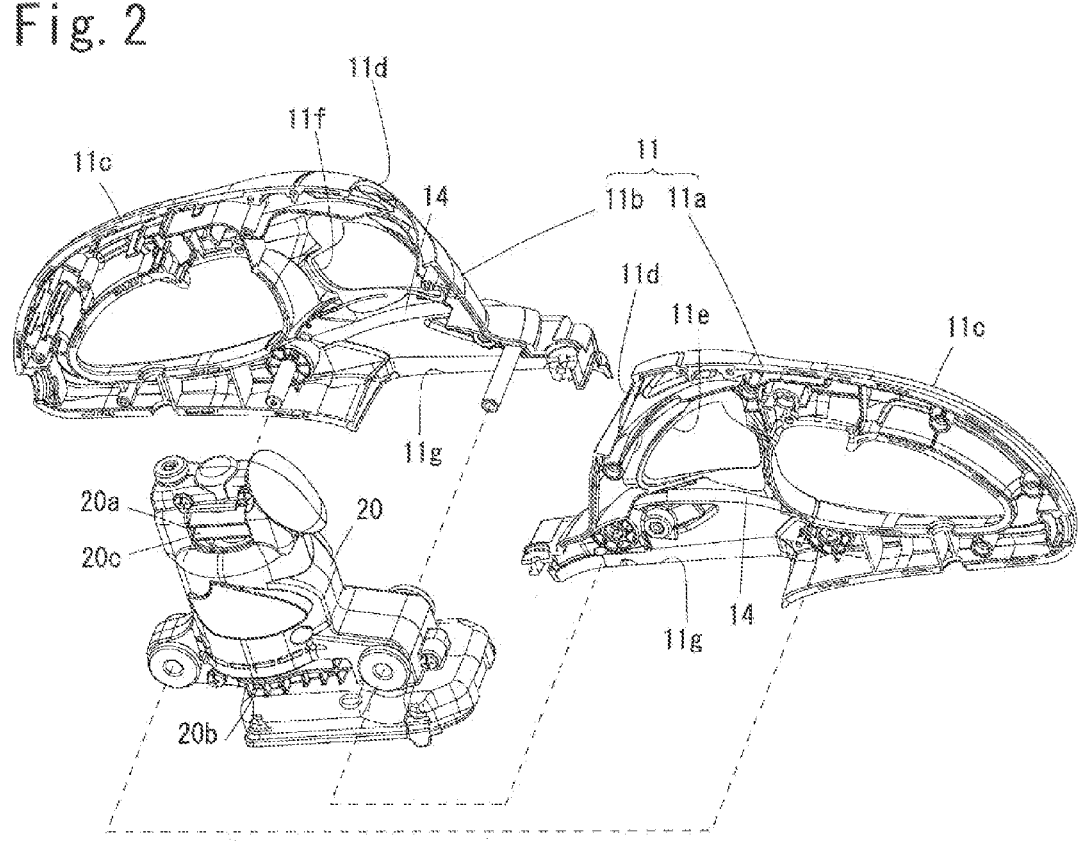
FIG. 2 is a disassembled view of the hedge trimmer shown in FIG. 1.
Figure 3:
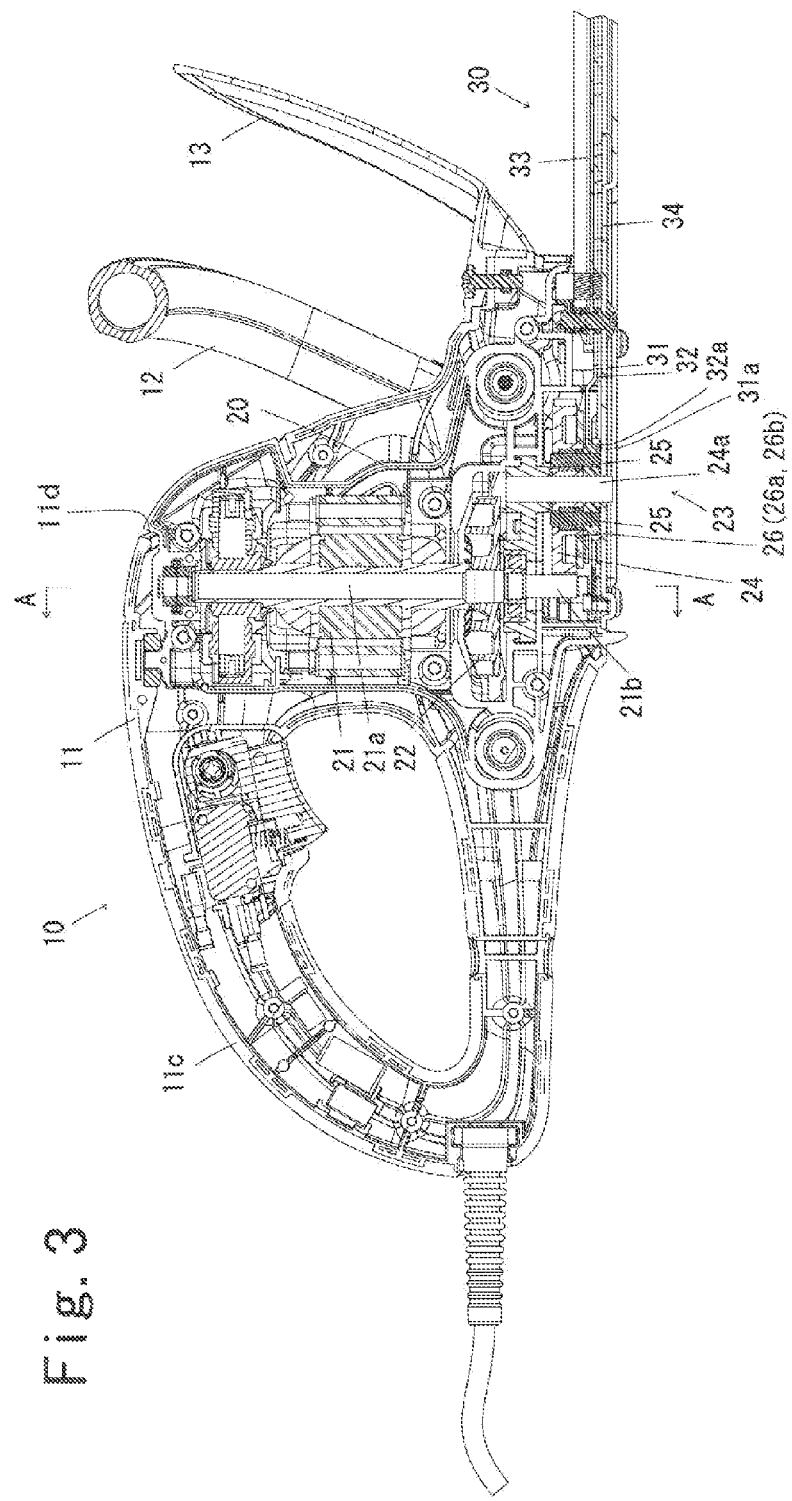
FIG. 3 is a sectional view taken along a fore-and-aft direction of the hedge trimmer.
Figure 4:
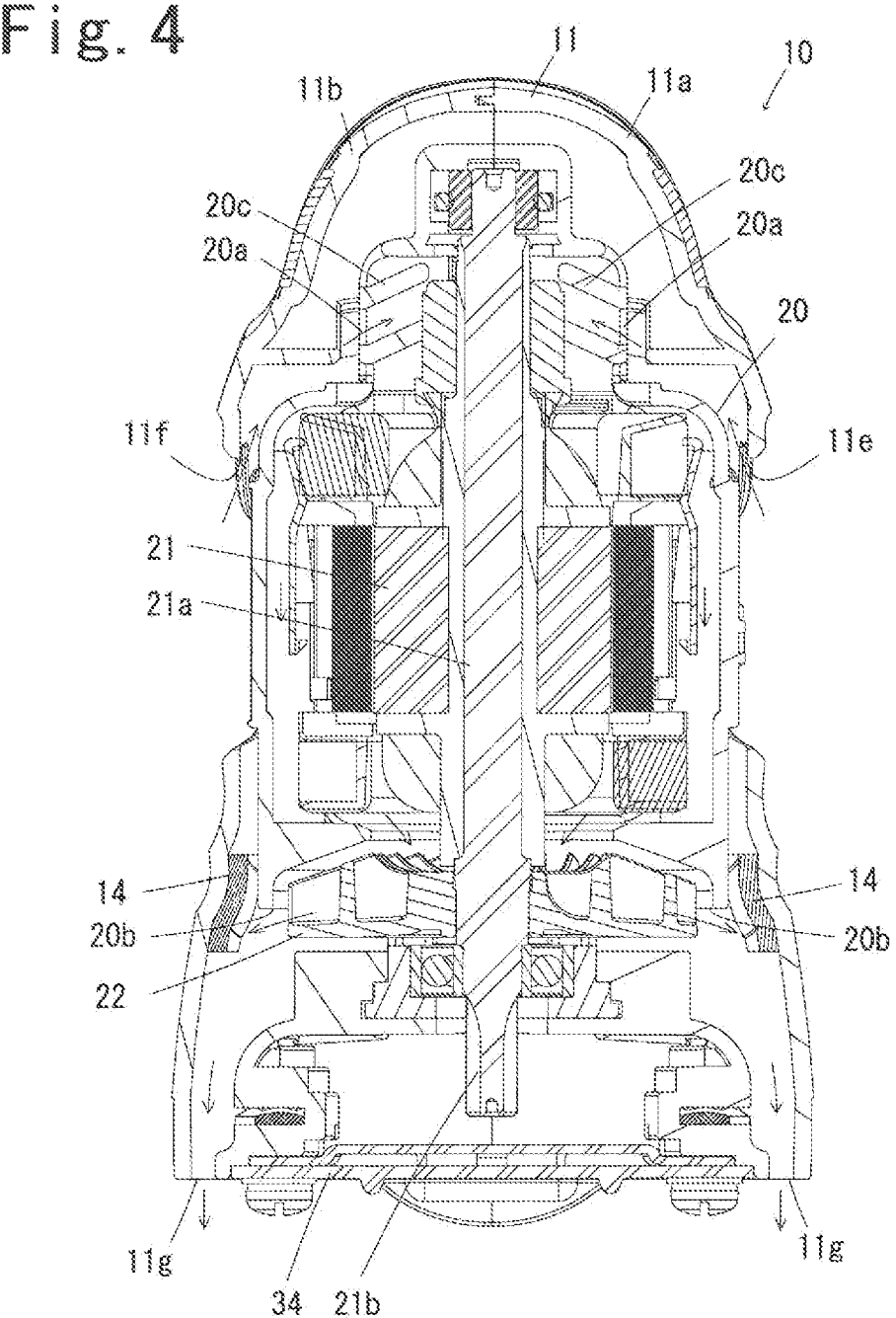
FIG. 4 is a sectional view take along line A-A in FIG. 3.

First Embodiment:

As shown in FIGS. 1-4, an electrically powered hedge trimmer 10 of the present invention includes an electric motor 21 mounted upright within an outer shell housing 11, a pair of relatively reciprocating shear blades 31, 32 assembled within a lower portion of the outer shell housing 11 to be driven by operation of the electric motor 21 through a crank mechanism 23, and a cooling fan 22 assembled to be driven by rotation of the motor 21 for introducing outside air into an upper portion of shell housing 11 and for blowing out the sucked air from a lower portion of the shell housing 11. In this hedge trimmer 10, as shown in FIG. 4, a downward opening 11g is formed in a lower portion of the peripheral wall of shell housing 11 enclosing a side portion of the crank mechanism 23 such that the air exhausted by operation of the cooling fan 22 flows along an inner surface of the lower peripheral wall of shell housing 11 and blows out downward from the downward opening 11g. In addition, a noise absorption material 14 is attached to the inner surface of the peripheral wall of shell housing in a position exposed to the air ejected from the cooling fan 22.

Figure 1:
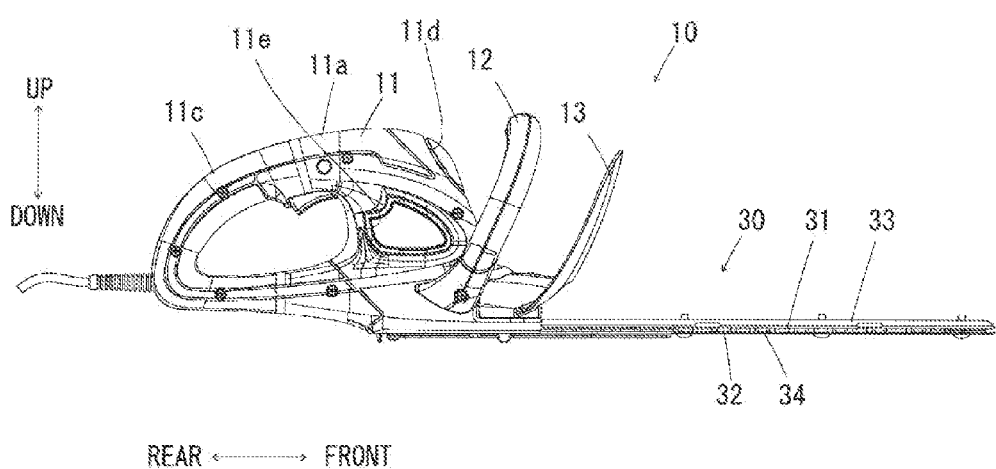
FIG. 1 is a side view of an electrically powered hedge trimmer in a first embodiment of the present invention.

As shown in FIGS. 1-3, the outer shell housing 11 of hedge trimmer 10 is composed of two parts 11a and 11b. A motor housing 20 is assembled within the outer shell housing 11 for containing the cooling fan 22 and the crank mechanism 23 together with the electric motor 21. The outer shell housing 11 has a rear portion integrally provided with a grip 11c to be grasped with one hand of an operator. A chip guard 13 is fixed to the front portion of shell housing 11 at the front side of a front grip 12 to protect the operator from shrubs, tree branches splashed by cutting. The outer shell housing 11 is formed at its upper and side walls with openings 11d-11f for introducing outside air into an air intake opening 20a of the motor housing 20. As shown in FIG. 4, the downward opening 11g is formed at the front bottom of shell housing 11 for mounting a blade assembly 30 within the motor housing 20 and for causing the downward flow of air from an exhaust opening 20b of motor housing 20.

As shown in FIGS. 3 and 4, the motor housing 20 is formed to contain therein the cooling fan 22 and crank mechanism 23 together with the electric motor 21. As shown in FIGS. 2 and 4, the motor housing 20 is formed at its upper peripheral wall with the air intake opening 20a and at its lower peripheral wall with the exhaust opening 20b. The air intake opening 20a of motor housing 20 is provided with two-step ribs 20c which are inclined upward at their inside portions to cause the downward flow of driving noise in the motor housing 20.

The electric motor 21 is mounted upright within the motor housing 20. The cooling fan 22 is mounted on the output shaft 21a of motor 21 to be driven for introducing outside air into the air intake opening 20a of motor housing 20 and for passing the introduced air through the periphery of motor 21 and blowing out the air radially downward from the exhaust opening 20b.

As shown in FIG. 3, the crank mechanism 23 is assembled within the lower portion of motor housing 20 to convert rotation of the motor 21 to relatively reciprocating movements of the shear blades 31, 32. The crank mechanism 23 includes a speed reduction gear 24 in mesh with a pinion gear 21b fixed to a distal end of drive shaft 21a of motor 21 and a crank cam 26 mounted to a bottom surface of speed reduction gear 24 by means of two pins 25, 25. The crank cam 26 is in the form of two disc plates 26a, 26b which are eccentrically mounted on the rotation shaft 24a of speed reduction gear 24 and opposed across the rotation shaft 24a of speed reduction gear 24 in a phase difference of 180°

As shown in FIGS. 1 and 3, the blade assembly 30 is mounted on the bottom surface of motor housing 20. The blade assembly 30 is composed of a pair of shear blades 31, 32 supported in face-to-face contact and a pair of guide plates 33, 34 supporting the shear blades 31, 32 in such a manner as to permit movement of them in a fore-and-aft direction. The shear blades 31, 32 each are formed with a series of cutter teeth along its longitudinal edges. The disc plates 26a, 26b of crank cam 26 are coupled with cam follower slots 31a, 32a formed in the base portions of shear blades 31, 32 to be movable in a lengthwise direction. In a condition where both the shear blades 31, 32 are held between the upper and lower guide plates 33, 34, the base end portion of lower guide plate 34 is detachably fixed to the bottom surface of motor housing 20.

In a condition where the motor housing 20 assembled within the outer shell housing 11 as shown in FIG. 4, the air intake opening 20a and exhaust opening 20b of motor housing 20 are enclosed by the peripheral wall of outer shell housing 11 with a space. The noise absorption element 14 of sponge material is adhered to a lower portion of the inner surface of the peripheral wall of outer shell housing 11 to be exposed to the air spouted from the exhaust opening 20b of motor housing 20. The noise absorption element 14 is effective to restrain the occurrence of noise caused by downward deflection of the spouted air blowing against the inner surface of the peripheral wall of outer shell housing 11. The noise absorption element 14 is, for example, in the form of a foamed sponge material of urethane, polyurethane or EVA. It is preferable that the density of the foamed sponge material is about 20 kg/m3~200 kg/m$^3$. The foam rate and thickness of the noise absorption element is determined in accordance with a frequency for noise reduction. Desirably the noise absorption rate of the element is determined to be more than 30% based on JIS-A 1405. The noise absorption in the present invention means that a noise value measured on a basis of IEC60745-1 of a garden tool decreases about 0.5 dB. In this embodiment, it is to be noted that the lower peripheral wall of outer shell housing 11 is formed to enclose the lower end portion of motor housing 20 containing the crank mechanism 23 at its bottom. With such arrangement of the outer shell housing 11 relative to the motor housing 20, the opening 11g of the lower peripheral wall of outer shell housing 11 is opened downward without any obstacle to the exhaust passage beneath the lower end portion of motor housing 20.

When the electric motor 21 is activated for use of the hedge trimmer 10, the shear blades 31, 32 are reciprocally driven through the crank mechanism 23, and the cooling fan 22 is driven for introducing outside air into the upper portion of motor housing 20. Specifically, the speed reduction gear 24 in mesh with the pinion 21b is driven by rotation of the drive shaft 21a of electric motor 21 to eccentrically rotate the disc plates 26a, 26b of crank cam 26 mounted on the speed reduction gear 24 in the phase difference of 180°. The reciprocally relative movements of the shear blades 31, 32 is caused by eccentric rotation of the disc plates 26a, 26b coupled with cam follower slots 31a, 31b formed in the proximal ends of shear blades 31, 32.

In such an instance, as shown by an arrow in FIG. 4, the outside air is introduced into the air intake opening 20a of motor housing 20 through the openings 11d~11f of outer shell housing 11. Thus, the electric motor 21 is cooled by the air flowing downward from the upper portion of motor housing 20, and the cooling air is radially spouted from the exhaust opening 20b at the lower portion of motor housing 20. The spouted air blows against the inner surface of the peripheral wall of outer shell housing 11 and deflects downward to blow out downward from the opening 11g at the lower end portion of outer shell housing 11 through the exhaust passage between the lower end peripheral walls of motor housing 20 and outer shell housing 11.

In such a condition where the air deflects downward to blow out from the downward opening 11g, the noise absorption element 14 attached to the inner surface of outer shell housing 11 is exposed to the air spouted from the exhaust opening 20b of motor housing 20 to restrain noises caused by downward deflection of the air at the inner surface of outer shell housing 11. Thus, the air spouted from the exhaust opening 20b efficiently blows out from the downward opening 11g of outer shell housing 11 through the space between the lower end peripheral walls of motor housing 20 and outer shell housing 11.

As the downward opening 11g of outer shell housing 11 is provided without any obstacle at the exhaust passage beneath the bottom of motor housing 20, the exhaust air blows out toward a hedge to be sheared or trimmed without blowing out sideward to an operator of the hedge trimmer. Thus, blow noises of the exhaust air are directed downward from the outer shell housing 11 to improve a working condition of the operator.

Figure 5:
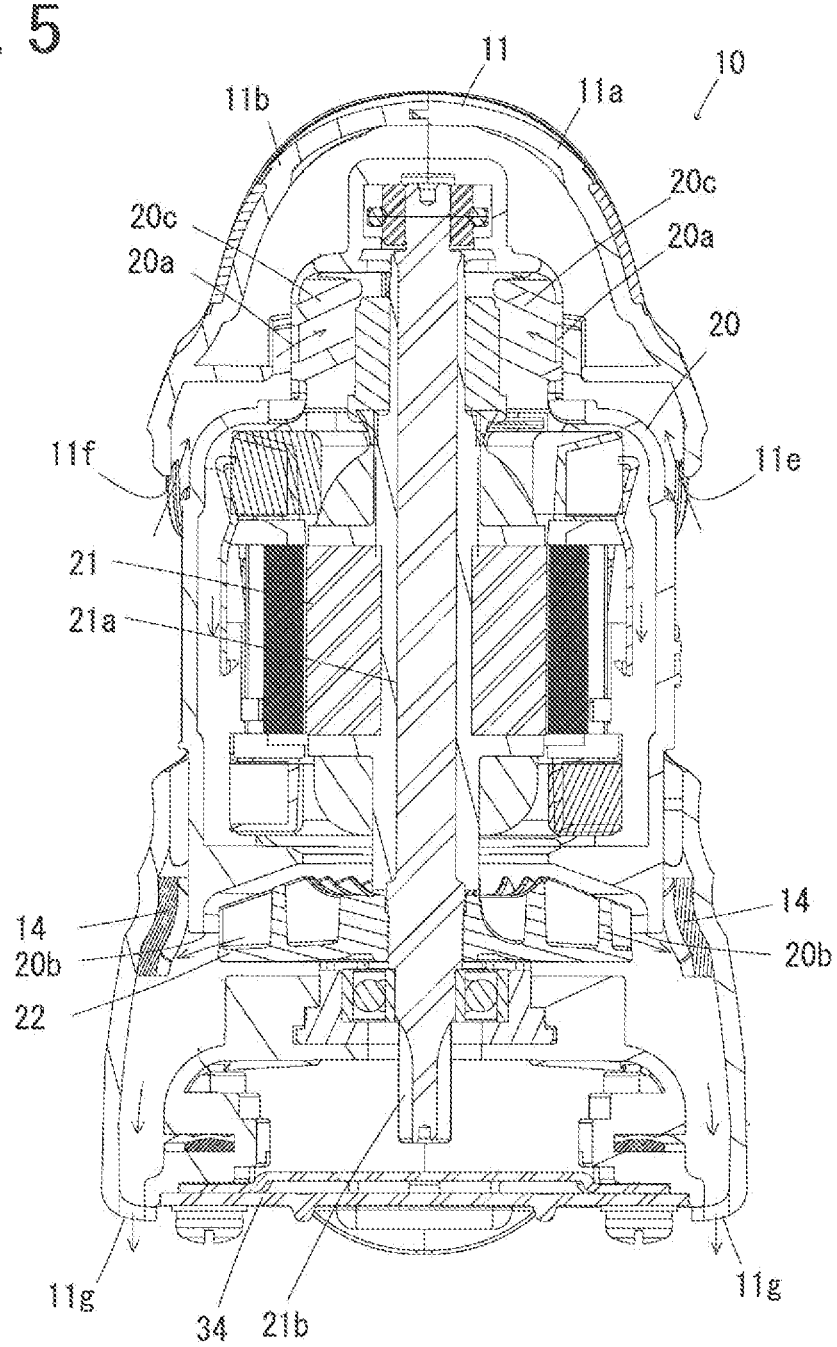
FIG. 5 is a sectional view of a modification of the hedge trimmer shown in FIG. 4.

Although in this embodiment, the downward exhaust opening 11g of outer shell housing 11 is formed in a portion surrounded by the lower end peripheral wall of outer shell housing 11, the lower end peripheral wall of outer shell housing 11 may be formed to provide the downward exhaust opening 11g as shown in FIG. 5. As the crank mechanism 23 in the embodiment is enclosed by the lower end periphery of outer shell housing 11g, the operator is not suffer from operation noise of the crank mechanism. Although in the first embodiment, the outer shell housing 11 is composed of left and right parts 11a, 11b. the outer shell housing 11 may be composed of a single structure or more than three parts.

Figure 6:
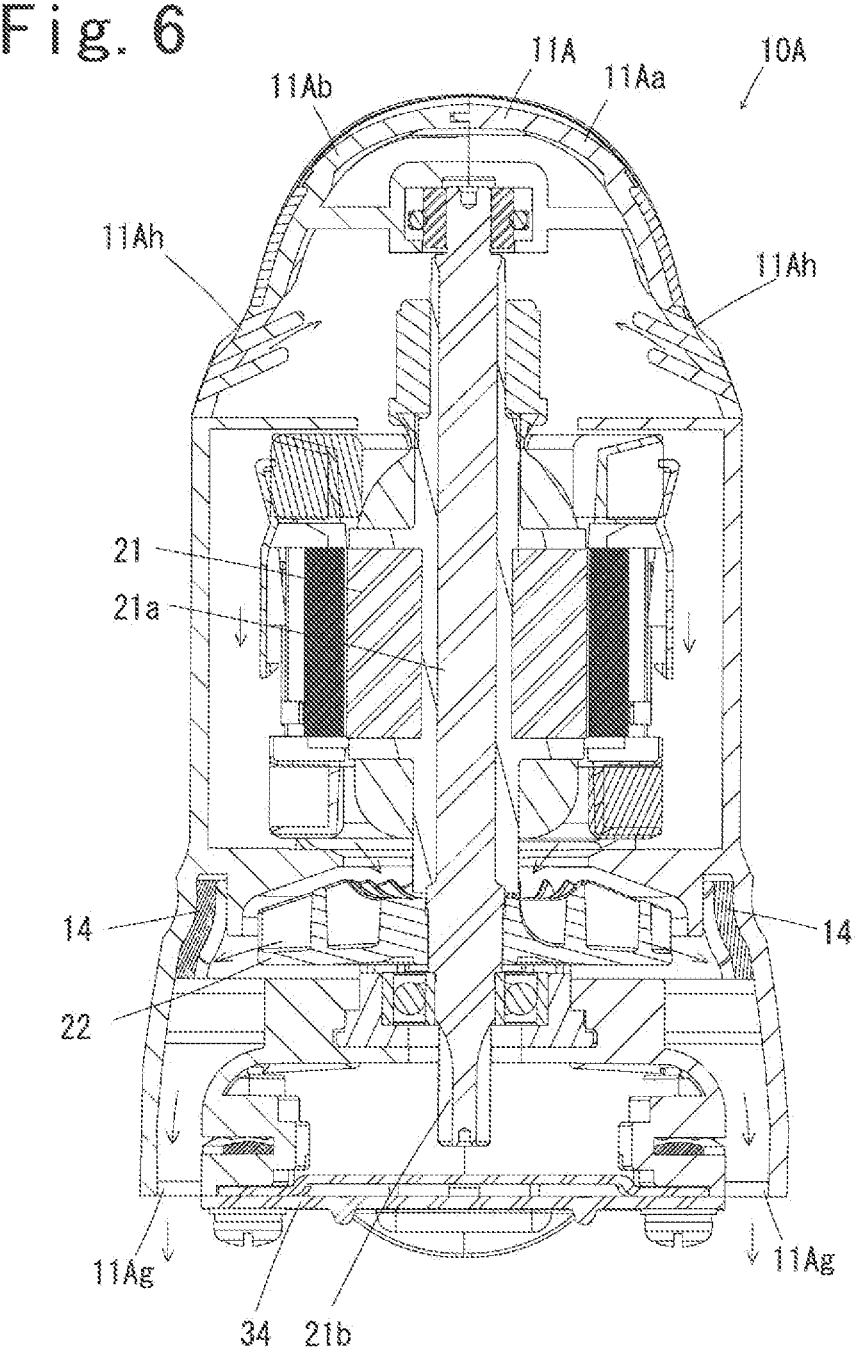
FIG. 6 is a sectional view taken along line A-A of a hedge trimmer in a second embodiment of the present invention.

Second Embodiment:

In a hedge trimmer 10A shown in FIG. 6, the electric motor 21, cooling fan 22 and crank mechanism 23 are assembled within an outer shell housing 11A without the motor housing 20. In the hedge trimmer 10A, an air intake opening 11Ah is formed in the upper peripheral wall of outer shell housing 11A for introducing outside air therein during operation of the cooling fan, and an exhaust opening 11Ag is formed within the lower end peripheral wall of outer shell housing 11A. The exhaust opening 11Ag is opened downward without any obstacle in the exhaust passage as in the first embodiment. The noise absorption element 14 is attached to an inner surface of outer shell housing 11A exposed to the air spouted from the cooling fan 22 there by to restrain blowing noise caused by deflection of the spouted air.

Assuming that the cooling fan 22 is operated by activation of the electric motor 21, the outside air is introduced into the upper portion of outer shell housing 11A through the air intake opening 11Ah and flows into the lower portion of outer shell housing through the periphery of electric motor 21. Thus, the electric motor 21 is cooled by the air sucked by rotation of the cooking fan 22, while the spouted air blows against the noise absorption element 14 and deflects downward to blow out from the exhaust opening 11Ag. This is effective to restrain the occurrence of blowing noise caused by deflection of the spouted air.

What is claimed is:

1. An electrically powered garden tool, comprising:
   an electric motor having a drive shaft and mounted upright within an outer shell housing,
   a pair of relatively reciprocating shear blades assembled to be driven by operation of said motor through a crank mechanism provided within a lower portion of said outer shell housing,
   and a cooling fan assembled to be driven by operation of said motor for introducing outside air into an upper portion of said outer shell housing and for exhausting the introduced air from said lower portion of said outer shell housing,
   wherein a downward exhaust opening is formed within a lower end of a peripheral wall of said outer shell housing enclosing the crank mechanism,
   wherein the downward exhaust opening is opened in a downward direction and is devoid of any obstacle such that the air, spouted by rotation of said cooling fan, blows out in the downward direction from the downward exhaust opening, wherein the downward direction extends in a direction of a central axis of said outer shell housing that extends from said upper portion of said outer shell housing to said lower portion of said outer shell housing,
   said lower end of said peripheral wall of said outer shell housing extending such that exhausted air is blown out from the downward exhaust opening without being obstructed by any parts of the garden tool in a direction generally parallel to a longitudinal axis of said drive shaft of said motor, and wherein
   a noise absorption element is attached to an inner surface of said peripheral wall of said outer shell housing.

2. The electrically powered garden tool as claimed in claim 1, wherein a motor housing is assembled within said outer shell housing to contain therein said electric motor, cooling fan and crank mechanism, and wherein said motor housing is provided with an exhaust opening to exhaust the air spouted by rotation of said cooling fan so that the spouted air blows out in the downward direction from the downward exhaust opening of said outer shell housing and through a space between the peripheral walls of said motor housing and said outer shell housing.

* * * * *